US008456103B2

(12) United States Patent
Grajcar

(10) Patent No.: US 8,456,103 B2
(45) Date of Patent: *Jun. 4, 2013

(54) CURRENT REGULATOR APPARATUS AND METHODS

(75) Inventor: Zdenko Grajcar, Crystal, MN (US)

(73) Assignee: Nexxus Lighting, Incorporated, Charlotte, NC (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/100,945

(22) Filed: May 4, 2011

(65) Prior Publication Data

US 2011/0260641 A1    Oct. 27, 2011

Related U.S. Application Data

(63) Continuation of application No. 12/546,070, filed on Aug. 24, 2009, now Pat. No. 7,960,921, which is a continuation of application No. 11/805,952, filed on May 25, 2007, now Pat. No. 7,598,682.

(60) Provisional application No. 60/808,881, filed on May 26, 2006.

(51) Int. Cl.
*H05B 37/02* (2006.01)

(52) U.S. Cl.
USPC .................. 315/291; 315/209 R; 315/307

(58) Field of Classification Search
USPC ............. 315/209 R, 224, 225, 244, 247, 291, 315/307, 302, 360–362
See application file for complete search history.

(56) References Cited

U.S. PATENT DOCUMENTS

| 5,661,645 | A | 8/1997 | Hochstein | |
| 5,907,467 | A * | 5/1999 | Barbour | 361/170 |
| 6,275,018 | B1 | 8/2001 | Telefus et al. | |
| 6,940,733 | B2 | 9/2005 | Schie et al. | |
| 7,071,625 | B2 | 7/2006 | Cheng et al. | |
| 7,145,295 | B1 | 12/2006 | Lee et al. | |
| 7,276,861 | B1 * | 10/2007 | Shteynberg et al. | 315/291 |
| 7,960,921 | B2 * | 6/2011 | Grajcar | 315/291 |
| 2005/0218838 | A1 | 10/2005 | Lys | |
| 2007/0024213 | A1 * | 2/2007 | Shteynberg et al. | 315/291 |

FOREIGN PATENT DOCUMENTS

JP    2004-296205 A    10/2004

* cited by examiner

*Primary Examiner* — Jimmy Vu
(74) *Attorney, Agent, or Firm* — Baker & Hostetler, LLP

(57) ABSTRACT

An apparatus according to the present invention provides regulated pulsed current to an LED from a voltage source such as a rectified AC voltage. The present inventions provide methods for delivering regulated pulsed current to an LED from the voltage source.

4 Claims, 8 Drawing Sheets

CURRENT REGULATOR APPARATUS AND METHODS

CROSS REFERENCE TO PRIOR APPLICATIONS

This is a continuation of U.S. patent application Ser. No. 12/546,070 filed Aug. 24, 2009, and claims the benefit of U.S. patent application Ser. No. 11/805,952 filed May 25, 2007 and claims the benefit and priority of U.S. provisional patent application No. 60/808,881 filed on May 26, 2006, the disclosures of each are hereby incorporated by reference in their entirety.

BACKGROUND OF THE INVENTION

1. Field of the Invention

The present inventions relate to electrical circuits and, more particularly, circuits for operation of light emitting diodes.

2. Brief Description of the Related Art

A step down voltage regulator is commonly used in systems that use high input voltages such as 24V, 48V, 120V or higher that must be locally converted to a lower voltage such as 15V, 12V or 5V with very little power loss. A Buck regulator is an example of a DC to DC step-down voltage regulator. The Buck regulator, unlike linear dissipative regulators, can be used to step DC voltage down to a lower DC voltage of the same polarity. For stable DC input voltages such as in battery powered systems, traditional Buck regulators provide a very efficient form of power conversion from higher to lower voltages.

A Buck regulator in electrical communication with a discontinuous DC voltage source is illustrated in FIG. 1. The Buck regulator takes advantage of the energy storage characteristics of two passive components, a capacitor for voltage storage and an inductor for current storage. The Buck regulator alternates between two modes of operation, an ON mode and an OFF mode. In the ON mode, the capacitor, the inductor, and the LED are connected to the source voltage, which charges the inductor and the capacitor and powers the LED. In the OFF mode, the capacitor, the inductor, and the LED are disconnected from the voltage source, and the inductor and the capacitor are discharged into the LED.

However, Buck regulators may have some disadvantages. Voltage ripple is the phenomenon where the voltage rises during the ON mode and falls during the OFF mode. Several factors contribute to voltage ripple including, but not limited to, switching frequency, capacitance, load, and any current limiting features of the control circuitry. At the most basic level, the output voltage will rise and fall as a result of the charging and discharging of the capacitor. Qualitatively, as the capacitance increases, the magnitude of the voltage ripple decreases. The capacitance is generally limited by cost, physical size and non-idealities of various capacitor types. The magnitude of the voltage ripple also decreases as the switching frequency increases. However, the ability to increase the switching frequency is limited. Switching losses reduce efficiency, and non-ideal switching characteristics of the free-wheeling diode can also reduce efficiency and may raise EMI concerns.

When the voltage source is a rectified AC voltage with a sinusoidal waveform, the switching frequency may be based on the frequency of the voltage source. A large capacitance may be required to reduce ripple to an allowable level. Buck regulators typically use an electrolytic capacitor to reduce voltage ripple to the allowable level. However, the use of electrolytic capacitors introduces several parasitic elements which can make buck regulator performance less than ideal. Large electrolytic capacitors have a large equivalent series resistance (ESR) which directly affects the performance and efficiency of any switching regulator. Electrolytic capacitors have high ESR because the dielectric contains a liquid-based electrolyte. At low operating temperatures, the ESR of a typical aluminum electrolytic may increase by 40 times as the temperature drops from 25° C. to −40° C., which will typically cause the capacitor to quit working. At high temperatures and/or high operating current, the liquid present in the capacitor may evaporate and the ESR increases due to internal heat generation. Unfortunately, as the ESR goes up, so does the internal heat generation, which can cause the capacitor to fail. In extreme cases, the electrolyte can actually boil and cause the capacitor to explode.

A light emitting diode (LED) may operate in two different modes, either a constant current mode, which is the most common, or a pulsed current mode. In the constant current mode, a constant DC current is delivered to the LED. In the pulsed current mode, pulses of regulated current are delivered to the LED. The pulsed current mode with specified maximum duty cycle and maximum pulse width is recommended by majority of the LED manufacturers, because the LED may cool between pulses, which may prolong the life of the LED.

Accordingly, a need exists for a device that may deliver a regulated pulsed current to an LED, and that may avoid the problems associated with devices such as Buck regulators.

SUMMARY OF THE INVENTION

Apparatus and methods in accordance with the present invention may resolve many of the needs and shortcomings discussed above and provide additional improvements and advantages as will be recognized by those skilled in the art upon review of the present disclosure.

An apparatus according to the present invention provides regulated pulsed current from a constant polarity discontinuous DC voltage source such as a rectified AC voltage. The apparatus may include a regulating unit. The regulating unit is operable in a power mode and in a setback mode. In the power mode, the regulating unit may receive current from the voltage source and flow the current onto an LED. The apparatus may also include a switch control in electronic communication with the regulating unit to control the regulating unit in order to flow regulated current onto the LED during the power mode. The switch control may also place the regulating unit in the setback mode. Substantially no current flows onto the LED during the setback mode.

The present inventions may also include methods for providing regulated pulsed current from a constant polarity discontinuous DC voltage source. The methods may include providing a regulating unit, the regulating unit allowing current to flow onto an LED from a voltage source, and providing a switch control. The methods may include determining a setback mode and a power mode, and the switch control controlling the regulating unit thereby allowing a regulated current to flow onto the LED during the power mode. The methods may further include providing an inductor and a switch electrically communicating in series with the LED in the regulating unit. Regulating the current flow onto the LED by charging the inductor from the voltage source and discharging current from the inductor onto the LED by toggling the switch between an ON state and an OFF state may also be included in the methods according to the present inventions.

Determining the power mode and the setback mode from the waveform of the voltage source may also be included in the methods.

DETAILED DESCRIPTION OF THE INVENTION

Figure 1:
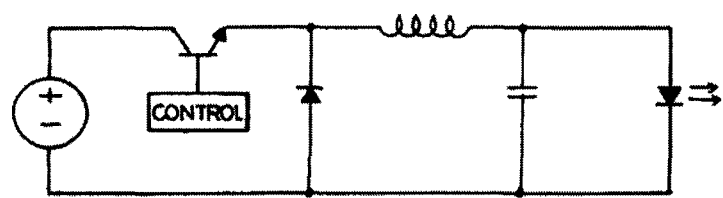
FIG. 1 illustrates a schematic diagram of a Buck regulator.

An apparatus 10 according to the present invention provides regulated pulsed current from a constant polarity discontinuous DC voltage source 100 to an LED 30. The apparatus 10 may operate in a power mode and a setback mode. During the power mode, the apparatus 10 flows regulated current onto the LED 30. Substantially no current flows onto the LED 30 in the setback mode. The apparatus 10 is configured to alternate between the power mode and the setback mode in order to provide regulated pulse current to the LED The power mode and the setback mode may correspond to portions of the waveform of the voltage source 100. The apparatus 10 may toggle between the setback mode and the power mode so that regulated pulses of current are provided to the LED 30 only when sufficient voltage is available at the voltage source 100. For example, the setback mode may correspond to portions of the waveform generally below a threshold voltage $V_{mn}$. Portions of the waveform generally above the threshold voltage $V_{mn}$ may then generally correspond to the power mode.

The Figures generally illustrate exemplary embodiments of apparatus 10 and methods which include aspects of the present inventions. The particular embodiments of the apparatus 10 which are illustrated in the Figures have been chosen for ease of explanation and understanding of various aspects of the present inventions. The extension of the Figures and schematics with respect to number, position, relationship, capacities and dimensions of the components to form the devices will be explained or will be within the skill of the art after the following description has been read and understood. Further, the exact configuration and components necessary to conform to specific performance requirements will likewise be within the skill of the art after the following description has been read and understood. The illustrated embodiments are not meant to limit the scope of coverage but instead to assist in understanding the context of the language used in this specification and the appended claims. Accordingly, many variations from the illustrated embodiments may be encompassed by the appended claims.

The apparatus 10 according to the present invention may include a voltage source 100 having a constant polarity, a regulating unit 20, and a switch control 70. The regulating unit 20 and the switch control 70 may be in electrical communication with the voltage source 100. The apparatus 10 is configured to deliver regulated pulsed current derived from the voltage source 100 to the LED 30.

The voltage source 100 is a constant polarity discontinuous DC voltage source such as, for example, a rectified AC voltage. The AC voltage may be mains electric or may be a low voltage AC voltage that may be stepped down by transformer from mains electric. The AC voltage may typically range up to about 400V with a typical frequency range of from about 40 to 60 Hz although the frequency may be as high as around 400 Hz. In various aspects, a half-bridge rectifier, a full bridge rectifier, or other known rectifier may be used to rectify the AC voltage, and, accordingly, the voltage supplied by the voltage source 100 may have the wave form of a sinusoidal wave in positive quadrants with a period related to the period of the AC voltage supplied to the rectifier. In various other aspects, the voltage supplied by the voltage source 100 may have any of a variety of wave forms depending upon the nature of the voltage source 100, as would be readily recognized by those skilled in the art upon review of this disclosure.

The regulating unit 20 is configured to receive current from the voltage source 100 and to flow current onto the LED 30. The regulating unit 20 is operable in a power mode and in a setback mode and the regulating unit 20 may be placed in the power mode and placed in the setback mode in order to provide regulated pulsed current onto the LED 30. In various aspects, the regulating unit 20 may include an inductor 50, the LED 30, a switch 60, and a free-wheel diode 40. The regulating unit 20 may be in electronic communication with the voltage source 100 so that current from the voltage source 100 flows onto the regulating unit 20. In various aspects, the regulating unit 20 is configured to deliver a regulated current from the voltage source 100 to the LED 30 by modulating the switch 60 to charge the inductor 50 and discharge the inductor 50 through the LED 30. In various aspects, the regulating unit 20 is configured to toggle between the setback mode and the power mode to deliver regulated pulsed current to the LED 30 generally during the power mode.

The inductor 50 may be a single inductor 50 or a plurality of inductors configured to provide an inductance to the regulating unit 20. In the regulating unit 20, the inductor 50 is connected in series with the LED (Load?) 30 so that current stored in the inductor 50 may flow onto the LED 30.

The LED 30 may be any LED, and may include a plurality of LED's. The LED 30 is typically configured to provide lighting. However, the LED 30 may also be various other loads or combinations of loads as would be recognized by those skilled in the art upon review of this disclosure.

The switch 60 is included in the regulating unit 20 to control the flow of current from the voltage source 100 onto the LED 30. The switch 60 has two states, an ON state and an OFF state, and the switch 60 may be toggled between the ON state and the OFF state. When the regulating unit 20 is in electrical communication with the voltage source 100, current is allowed to flow onto the LED 30 from the voltage source 100 when the switch 60 is placed in the ON state. Substantially no current is allowed to flow onto the LED 30 from the voltage source 100 when the switch is placed in the OFF state. The switch 60 may be a transistor such as a MOSFET, an electromechanical switch, or other switch as would be recognized by those skilled in the art upon review of this disclosure.

The switch control 70 is configured to communicate with the switch 60 to the regulating unit 20 in the setback mode, to place the regulating unit 20 in the power mode, and to control the regulating unit to deliver regulated current onto the LED 30 during the power mode. The switch control 70 is configured to communicate a switch control signal to the switch 60, so that the switch control 70 may place the switch 60 in the ON state and in the OFF state.

In order to provide the regulated current pulse to the LED 30 during the power mode, the switch control 70 may toggle the switch 60 between the ON state and the OFF state to charge the inductor 50 and then discharge the inductor 50 onto the LED 30, respectively. In the ON state, current may flow from the voltage source 100 onto the LED 30 and through the inductor 50 to charge the inductor 50. When the current reaches the maximum regulated current $I_{mx}$, the switch 60 may be placed in the OFF state. Current ceases to flow from the voltage source 100 onto the LED 30, but current may then flow onto the LED 30 from the inductor 50 through the free-wheel diode 40 until the inductor 50 is generally discharged to the preset limit. Placement of the switch 60 in the ON state again allows current to flow from the voltage source 100 onto the LED 30 and to charge the inductor 50.

Substantially no current flows onto the LED 30 from the voltage source 100 when the switch 60 is placed in the OFF state. Accordingly, the OFF state may correspond to the setback mode, and the switch control 70 may place the regulating unit in the setback mode by placing the switch 60 in the OFF state.

The free-wheel diode 40 may be any suitable diode, transistor based switch, or other high speed switch to force the current to flow from the voltage source 100 onto the LED 30 and through the inductor 50 when the switch 60 is placed in the ON state, while allowing current to flow from the inductor 50 onto the LED 30 when the switch 60 is placed in the OFF state. In some aspects, the free-wheel diode 40 could be configured as a transistor or other high speed switch that is alternated between an ON state and an OFF state generally in unison with the switch 60.

The apparatus 10 according to the present invention further includes the switch control 70. The switch control 70 places the switch 60 in the OFF state and the ON state in order to place the regulating unit 20 in the setback mode and the power mode. In the power mode, the switch control 70 toggles the switch 60 between the OFF state and the ON state in order to regulate the current flow onto the LED 30.

In various aspects, the switch control 70 may toggle the switch 60 between the OFF state and the ON state to toggle the apparatus 10 between the setback mode and the power mode in response to a duty cycle signal from a duty cycle control 170. In the power mode, the switch control 70 may toggle the switch 60 between the OFF state and the ON state in response to a current sensor signal from a current sensor unit 110 and a timing signal from a clock 130 in order to provide regulated pulsed current to the LED 30. In other aspects, the switch control 70 may be keyed to various other signals indicative of states of the apparatus 10 including the current within the regulating unit 20 as would be recognized by those skilled in the art upon review of this disclosure. The switch control 70, in various aspects, may be in electrical communication with the voltage source 100 to derive power from the voltage source 100 and to ascertain various states such as the waveform of the voltage source 100.

The switch control 70 may, in various aspects, include the duty cycle control 170 configured to generate duty cycle control signals sequenced to the waveform of the voltage source 100. The duty cycle control signals may be indicative of the setback mode and power mode, and may cause the switch control 70 to place the apparatus 10 in the setback mode or in the power mode. Accordingly, the duty cycle control 170 may generate a duty cycle control signal configured as at least a first duty cycle control signal and a second duty cycle control signal. In various aspects, the first duty cycle control signal may be indicative of the setback mode, and the second duty cycle control signal may be indicative of the power mode. The duty cycle control signal may, in certain aspects, be a logical signal, for example, with 0 corresponding to the first duty cycle control signal (low) and, hence, indicative of the setback mode, and 1 corresponding to the second duty cycle control signal (high) and, hence, indicative of the power mode.

In various aspects, the duty cycle control 170 may sequence the first duty cycle control signal and the second duty cycle control signal to various portions of the waveform of the voltage source 100, so that the setback mode and the power mode correspond to the portions of the waveform of the voltage source 100. For example, the duty cycle control 170 may generate a second duty cycle control signal generally proximate to the maxima of the waveform and a first duty cycle control signal generally corresponding to the remaining portions of the waveform. As a further example, in aspects wherein the voltage source 100 has a sinusoidal waveform in positive quadrants, the first duty cycle control signal indicative of the setback mode may generally correspond to portions of this sinusoidal waveform below a threshold voltage $V_{mn}$. The second duty cycle control signal indicative of the power mode may generally correspond to portions of this sinusoidal waveform above the threshold voltage $V_{mn}$.

The current sensor unit 110 senses the current in the regulating unit 20 and generates a current sensor signal. In various aspects, the current sensor signal could be an analogue or digital signal indicative of the current flowing through the regulating unit 20. For example, in some aspects, the current sensor signal may be a logic signal with a high value corresponding to 1 and a low value corresponding to 0. Accordingly, the current sensor signal 0 could be generated by the current sensor unit 110 when the current flowing through the LED 30 equals or exceeds the maximum regulated current $I_{mx}$. The current sensor signal 1 could be generated by the current sensor unit 110 when the current in the regulating unit 20 is less than $I_{mx}$.

The switch control 70 may include the clock 130 which may be configured as an oscillator or suchlike that generates a timing signal. In various aspects, the timing signal may be configured as a logical signal with a first timing signal and a second timing signal. In various aspects, the first timing signal may be low (o) and the second timing signal may be high (1). The timing signal frequency may be related to the time required to charge the inductor 50 or to the time required to discharge the inductor 50 in various aspects, and the timing signal frequency may be chosen in order to provide a regulated current to the LED 30. The switch control 70, in various aspects, may toggle the switch 60 between the ON state and the OFF state in correspondence to the first timing signal and the second timing signal. In some aspects, the switch control 70 may toggle the switch 60 between the ON state and the OFF state generally at the timing signal frequency.

The switch control 70 may be in electrical communication with the switch 60. In various aspects, the switch control 70 may generate a switch control signal alterable between at least a first switch control signal to place the switch 60 in the OFF state and a second switch control signal to place the switch 60 in the ON state. For example, the switch control signal maybe configured as a binary signal with the first switch control signal equated to 0 (low) and the second switch control signal equated to 1 (high).

In some aspects, the switch control 70 may use a logical gate 190 such as a logic AND gate to generate the switch control signal. For example, the duty control signal, the timing signal, and the current sensor signal may be configured as logical signals that may be input into the logical gate 190. The logical gate 190 may then generate the switch control signal configured as a binary signal. The logical gate 190 may generate the second switch control signal when the duty cycle control 170 generates the second duty cycle control signal, the timing signal equates the second timing signal, and the current sensor signal equates to 1. Otherwise, the logical gate 190 may generate the first switch control signal. The duration of each first switch control signal and/or each second switch control signal generated by the logical gate 190 may correspond to the duration of the timing signal from the clock 130. Accordingly, in this example, the logical gate 190 can only generate the second switch control signal, which corresponds to the power mode, when the duty cycle control 170 generates the second duty cycle control signal. The logical gate 190 could generate the first switch control signal, which corresponds to the setback mode, only when the duty cycle control 170 generates the first duty cycle control signal.

In various aspects, the logical gate 190 may be a logic OR gate or various other logic gates as would be recognized by those skilled in the art upon review of this disclosure. It should also be understood that the various logical signals in various aspects of the apparatus 10 including the timing signal, the current sensor signal, switch control signal, and the duty cycle control signal may be adapted such that the low signal and the high signal are variously indicative. For example, in some aspects, the duty cycle control signal could be a logical signal with 0 corresponding to the first duty cycle control signal (low) and, hence, indicative of the setback mode, and 1 corresponding to the second duty cycle control signal (high) and, hence, indicative of the power mode. In other aspects, the duty cycle control signal could be a logical signal with 1 corresponding to the first duty cycle control signal (high) and indicative of the setback mode, and 0 corresponding to the second duty cycle control signal (low) and indicative of the power mode.

In aspects having the switch 60 configured as a transistor, the switch control 70 may be in electrical communication with the transistor gate to communicate the switch control signal to the transistor gate. The switch 60 may be placed in the ON state by, for example, the switch control 70 applying a high voltage corresponding to the second switch control signal to the transistor gate. Application of the high voltage corresponding to the second switch control signal to the gate causes the source and the drain of the transistor to be electrically connected. Accordingly, the switch 60 is in the ON state, and current flows from the voltage source 100 through the regulating unit 20. The switch 60 may be placed in the OFF state by, for example, the switch control 70 applying a substantially zero voltage corresponding to the first switch control signal to the transistor gate. Accordingly, the source and the drain are disconnected, so that the switch 60 is in the OFF state. No current flows from the voltage source 100 through the regulating unit 20.

Figure 2A:
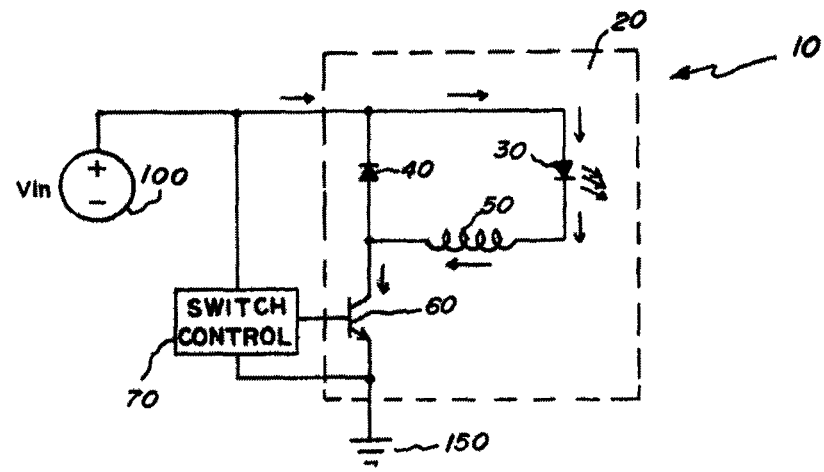
FIG. 2A illustrates a schematic diagram of an exemplary embodiment of an apparatus in accordance with the present inventions.
Figure 2B:
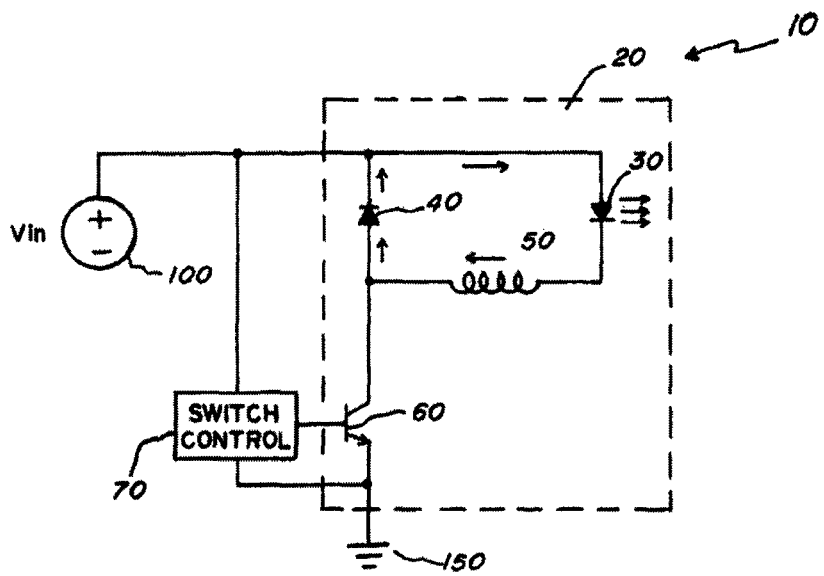
FIG. 2B illustrates another schematic diagram of an exemplary embodiment of an apparatus in accordance with the present inventions.

Specific embodiments of the apparatus 10 according to the present inventions are illustrated in the Figures. An apparatus 10 according to the present invention is illustrated in the schematic diagrams of FIGS. 2A and 2B. As illustrated, the apparatus 10 includes the regulating unit 20 and the switch control 70 in electrical communication with the voltage source 100. The voltage source 100 supplies power to the regulating unit 20. The regulating unit 20, as illustrated in FIGS. 2A and 2B, includes the inductor 50, the LED 30, the switch 60, and the free-wheel diode 40. Current may flow onto the LED 30 from the voltage source 100 when the switch 60 is in the ON state. Substantially no current flows onto the LED 30 from the voltage source 100 when the switch 60 is in the OFF state, but current may flow onto the LED 30 from the inductor 50 through the free-wheel diode 40.

The switch control 70, in this embodiment, is in electrical communication with the regulating unit 20 including the switch 60 and on the low side of the switch 60. As illustrated, the switch control 70 may be in electronic communication with the voltage source 100. The switch control 70 may toggle the switch 60 between the ON state and the OFF state to provide the regulated pulse of current in the power mode by flowing current onto the LED 30 from the voltage source 100, and discharging current from the inductor 50 through the free-wheel diode 40 onto the LED 30, respectively. The switch control 70 may toggle the switch 60 into the OFF state in order to enter the setback mode and may maintain the switch 60 in the OFF state throughout the duration of the setback mode to maintain the apparatus 10 in the setback mode.

Current flows in response to the state of the switch 60 during the power mode are illustrated in FIGS. 2A and 2B. In FIG. 2A, the switch 60 is toggled to the ON state by the switch control 70. With the switch 60 in the ON state, current flows as indicated by the arrows from the voltage source 100 onto the LED 30, through the inductor 50, and through the switch 60 to ground 150. The free-wheel diode 40 is reverse biased so that there is substantially no current flow across the free-wheel diode 40. When the switch 60 is toggled into the ON state, the current through the inductor 50, which has inductance L, may generally rise an amount ΔI in time interval Δt according to:

$$\Delta I = (V_{in} - V_{LED\ 30}) \Delta t / L$$

where $V_{in}$ is the voltage supplied by the voltage source 100 and $V_{LED}$ is the voltage drop (forward voltage) across the LED 30.

In FIG. 2B, the switch 60 is toggled to the OFF state by the switch control 70, so that the regulating unit 20 is disconnected from ground 150 and current is no longer supplied to the regulating unit 20 from the voltage source 100. The free-wheel diode 40 becomes forward biased, so that current flows from the inductor 50, through the free-wheel diode 40, and onto the LED 30. The current through the inductor 50 may generally drop an amount ΔI in time interval Δt according to:

$$\Delta I = -V_{LED\ 30} \Delta t / L$$

The minimum value for the voltage $V_{in}$ should be at least 2 times higher than the forward voltage of the LED 30 for high efficiency operation. For example, if $V_{in} = 2V_{LED}$, then the current through the inductor 50 will rise and fall the same amount ΔI in the same time interval Δt. By toggling the switch 60 between the OFF state and the ON state in such a way that the switch 60 is held in the OFF state for time interval Δt and held in the ON state for time Δt, the current through the circuit would generally fall an amount ΔI below the regulated current and then rise to $I_{mx}$ and then rise to $I_{mx}$, respectively.

Figure 3A:
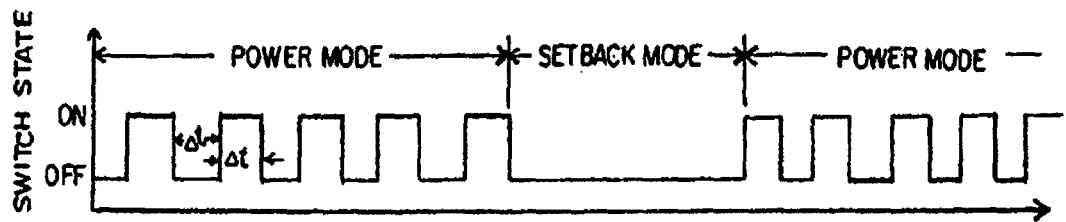
FIG. 3A illustrates a timing diagram of the switch state in an exemplary embodiment of an apparatus in accordance with the present inventions.
Figure 3B:
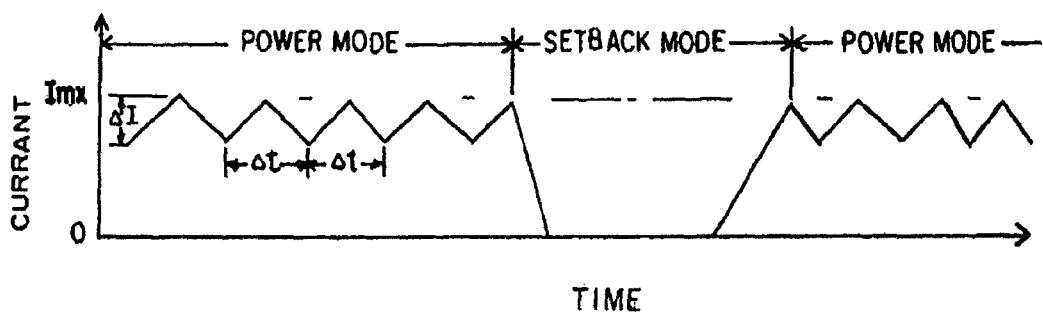
FIG. 3B illustrates a timing diagram of the current in the regulating unit of an exemplary embodiment of an apparatus in accordance with the present inventions.
Figure 3C:
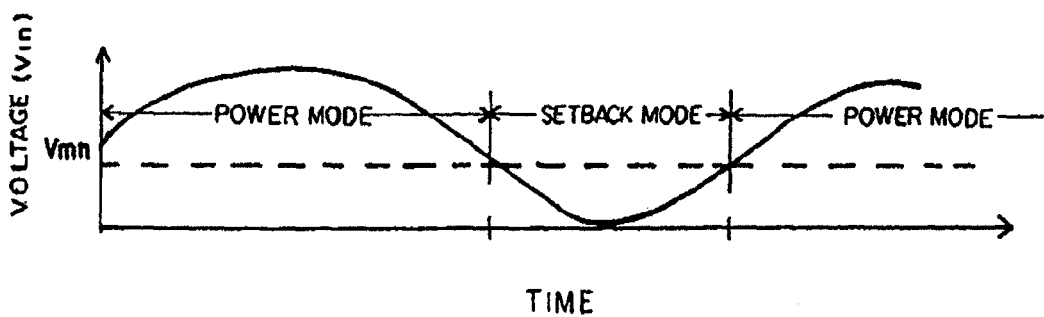
FIG. 3C illustrates a timing diagram of the waveform of the voltage source in an exemplary embodiment of an apparatus in accordance with the present inventions.

FIGS. 3A, 3B, and 3C illustrate the switch state, the current through the inductor 50, and the waveform of the voltage source 100, respectively, in an embodiment of an apparatus 10 according to the present inventions. As illustrated by comparing FIGS. 3A and 3B, as the switch 60 is toggled between the OFF state and the ON state, the current through the inductor 50 may fall an amount ΔI below the regulated current $I_{mx}$ in time interval Δt, and then rise a corresponding amount ΔI to the regulated current $I_{mx}$ during the power mode. The time interval Δt, the inductance L and the ripple ΔI are interrelated. For example, the ripple ΔI below the regulated current $I_{mx}$ may be decreased by increasing the inductance L of the inductor 50 or by decreasing the time interval Δt. By decreasing the time interval Δt, a smaller inductance L, and, hence, a smaller inductor 50 would be required to control the ripple ΔI within desirable limits.

The power mode and the setback mode are also illustrated by FIGS. 3A, 3B, and 3C for an embodiment of an apparatus 10 according to the present inventions. As illustrated in FIGS. 3A and 3B, during the power mode, the regulated pulse of current is supplied to the LED 30 by toggling the switch 60 between the ON state and the OFF state. During the setback mode, the switch 60 is held in the OFF state, as illustrated in FIG. 3A, so that substantially no current flows onto the LED 30, as illustrated in FIG. 3B. As illustrated in FIG. 3C, the power mode and the setback mode may be sequenced to the waveform of the voltage source 100. As illustrated in FIG. 3C, the power mode may be initiated when the voltage generally exceeds the minimum voltage $V_m$ and the setback mode may be initiated when the voltage drops generally below the minimum voltage $V_m$. Accordingly, in this embodiment, the regulated pulse of current is flowed onto the LED 30 generally only during the power mode when the voltage supplied by the voltage source 100 exceeds the minimum voltage $V_m$.

Figure 4A:
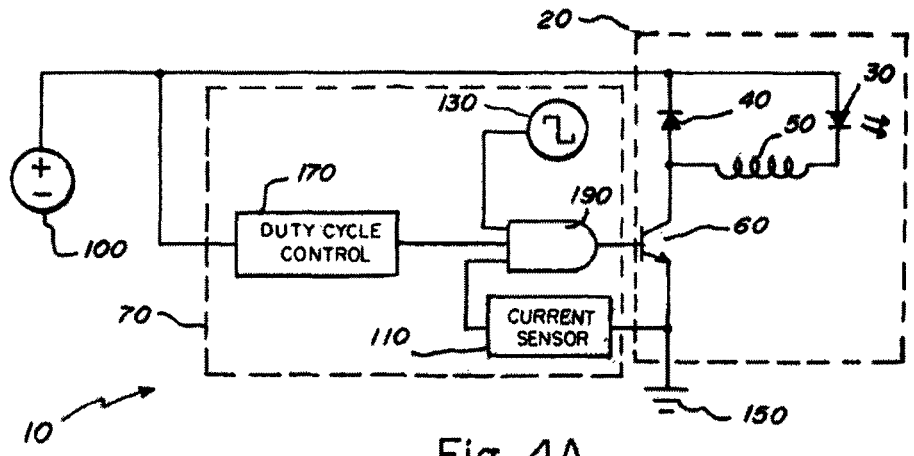
FIG. 4A illustrates a schematic diagram of an exemplary embodiment of an apparatus in accordance with the present inventions.
Figure 4B:
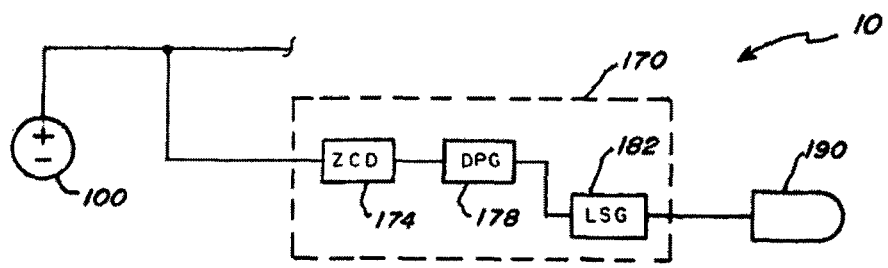
FIG. 4B illustrates a schematic diagram of an exemplary embodiment of a duty cycle control of an apparatus in accordance with the present inventions.
Figure 4C:
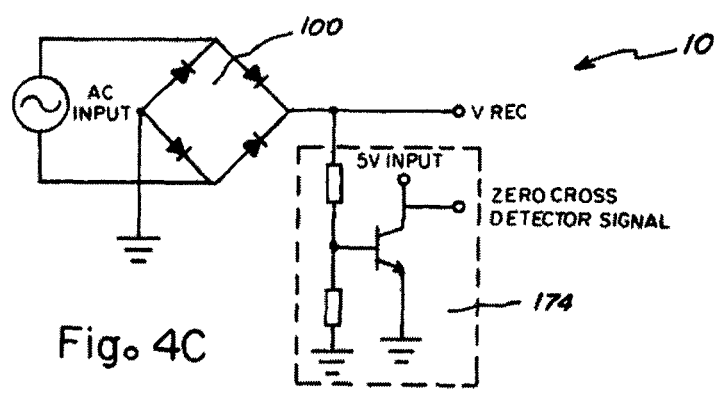
FIG. 4C illustrates a schematic diagram of an exemplary embodiment of a zero cross detector of an apparatus in accordance with the present inventions.

An embodiment of an apparatus 10 according to the present inventions including the regulating unit 20 and switch control 70 is illustrated in FIGS. 4A, 4B, and 4C. In this illustrated embodiment, the switch control 70 includes clock 130, current sensor unit 110, duty cycle control 170, and logical gate 190.

The clock 130, in this embodiment, continuously generates a high frequency timing signal configured as a logical signal, which may range in frequency from several kHz to several MHz. The frequency of the timing signal is limited by the maximum switching frequency of the switch 60. If a MOSFET or similar device is used for the switch 60, the timing signal frequency may be several MHz. The higher the timing signal frequency, the smaller the inductance L that is required to maintain a stable regulated current in the circuit. The timing signal is input to the logical gate 190 in this embodiment.

The current sensor unit 110 may sense the current at a point in the regulating unit 20, for example, the current to ground 150 on the low side of the switch 60, as illustrated in FIG. 4A. The current sensor unit 110 generates a current sensor signal indicative of the current and configured as a logic signal in this embodiment. If, for example, the current reaches or exceeds the upper current limit $I_{max}$, the current sensor unit 110 may generate the low signal (0). If the current drops below $I_{max}$, the sensor generates the high signal (1). The current sensor signal is input to the logical gate 190 in this embodiment.

The duty cycle control 170 generates the duty cycle control signal to signal the setback mode and the power mode. In this embodiment, the duty cycle control signal is configured as a logical signal with the low signal (0) corresponding to the first duty cycle control signal and indicative of the setback mode, and the high signal (1) corresponding to the second duty cycle control signal and indicative of the power mode. In this embodiment, the duty cycle control 170 may generate the second duty cycle control signal generally proximate to the maxima of the waveform of the voltage source 100, and a first duty cycle control signal generally proximate to the remaining portions of the waveform.

In the embodiment illustrated in FIG. 4A, the timing signal, the current sensor signal, and the duty cycle control signal are input into the logical gate 190. The logical gate 190 may then generate the switch control signal configured as a binary signal. The logical gate 190 output signal, in this particular embodiment, is a logic signal generated by the logical gate 190 based on the truth table given in Table 1 below. According to this truth table, the logical gate 190 generates the second switch control signal only when the timing signal equates to 1, the current sensor signal equates to 1, and the duty cycle control 170 generates the second duty cycle control signal (1). Otherwise, the logical gate 190 generates the first switch control signal.

In the embodiment of current invention illustrated in FIG. 4A, the switch 60 is configured as a MOSFET. The switch control signal passes from the logical gate 190 to the MOSFET gate. A high logical gate 190 output signal corresponding to the second switch control signal applies voltage to the MOSFET gate, and allows current to flow between the source and the drain, so that the switch 60 is in the ON state. A low logical gate 190 output signal corresponding to the first switch control signal electrically disconnects the source and the drain. Substantially no current flows between the source and the drain, so that the switch 60 is in the OFF state.

TABLE 1

TRUTH TABLE FOR LOGICAL GATE

| Logic Signal From | | | Switch control |
|---|---|---|---|
| Duty Cycle control 170 | Clock 130 | Current sensor unit 110 | Signal (logical gate 190 output signal) |
| 1 | 0 | 0 | 0 |
| 1 | 1 | 0 | 0 |
| 1 | 0 | 1 | 0 |
| 1 | 1 | 1 | 1 |
| 0 | 1 | 1 | 0 |
| 0 | 0 | 1 | 0 |
| 0 | 0 | 0 | .0 |
| 0 | 1 | 0 | 0 |

An embodiment of the duty cycle control 170 that generates the first duty cycle control signal and the second duty cycle control signal indicative of the setback mode and the power mode, respectively, based upon the waveform of the voltage source 100 is illustrated in the block diagram of FIG. 4B. The duty cycle control 170, in the embodiment illustrated in FIG. 4B, includes a zero cross detector 174, a delay pulse generator 178, and a logical signal generator 182. The zero cross detector 174 generates a zero cross detector signal when the voltage at the voltage source 100 is substantially zero in this embodiment. The zero cross detector signal is communicated to the delay pulse generator 178. The delay pulse generator 178 then generates a delay pulse generator signal at a fixed time delay $t_D$, from the zero cross detector signal in this embodiment. The delay pulse generator signal is communicated to the logical signal generator 182. The logical signal generator 182 generates the duty cycle control signal configured as a logical signal with the low signal (0) corresponding to the first duty cycle control signal and the high signal (1) corresponding to the second duty cycle control signal in this embodiment. In this embodiment, the first duty cycle control signal is indicative of the setback mode, and the second duty cycle control signal is indicative of the power mode. The logical signal generator 182 generates the second duty cycle control signal for a specified duration $t_L$ upon receipt of the delay pulse generator signal. After duration $t_L$, the duty cycle control 170 generates the first duty cycle control signal. In various embodiments, the second duty cycle control signal may correspond to maxima of the waveform of the voltage source 100 or to time periods where voltage $V_{in}$ is generally greater than or equal to $V_{mn}$. The duty cycle control signal is then input to the logical gate 190.

FIG. 4C illustrates an embodiment of the zero cross detector 174. In this embodiment, the zero cross detector 174 is in electronic communication with the voltage source 100 configured as a rectified AC voltage. The zero cross detector 174, as illustrated, generates the zero cross detector signal with a frequency twice that of the AC line voltage frequency. For example, if the AC line voltage frequency is 60 Hz, the zero cross detector 174 will generate 120 zero cross detector signals per second. The zero cross detector signal is communicated to the delay pulse generator 178.

After receiving the zero cross detector signal, the delay pulse generator 178 then generates a delay pulse generator signal at a preset time delay $t_D$ from the zero cross detector signal in this embodiment. The time delay $t_D$ may be chosen so that the delay pulse generator signal generally coincides with the peak of the waveform of the voltage source 100. For a sinusoidal waveform, this value for $t_D$ generally corresponds to a phase angle of 90 degrees. In various embodiments, the time delay $t_D$ may be chosen so that the delay pulse generator signal generally coincides with other portions of the waveform, for example, that correspond to a minimum voltage $V_{mn}$. A peak voltage generator may be used as the delay pulse generator 178 in some embodiments. The delay pulse generator signal is communicated to the logical signal generator 182.

After receiving the delay pulse generator signal, the logical signal generator 182 generates the second duty cycle control signal. The duration $t_L$ of the second duty cycle control signal generated, in this embodiment, by the logical signal generator 182 corresponds to the duration of the power mode. For example, for a voltage source 100 that is a fully rectified 60 Hz line voltage, the period of one cycle is 8.3 ms. For a power mode with a duration of 10%, the duration $t_L$ of the duty cycle control signal is 830 μs. The duty cycle control signal may match the frequency of the voltage source 100. After time $t_L$ the logical signal generator 182 reverts to generating the first duty cycle control signal. The duty cycle control signal may be input to the logical gate 190, in this illustrated embodiment.

Figure 5A:
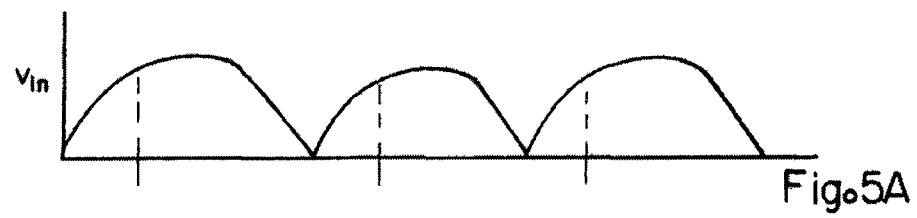
FIG. 5A illustrates a timing diagram of the waveform of the voltage source in an exemplary embodiment of an apparatus in accordance with the present inventions.
Figure 5B:
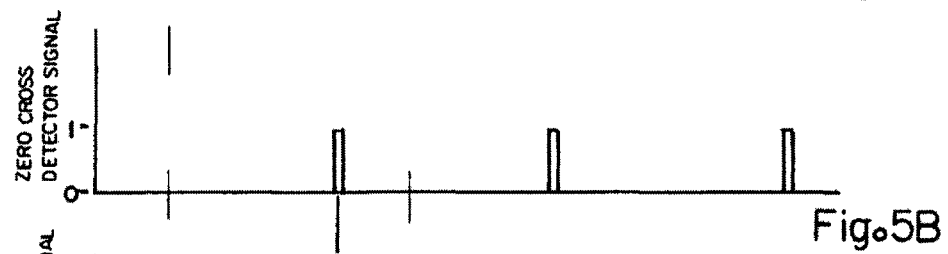
FIG. 5B illustrates a timing diagram of the zero cross detector signal in an exemplary embodiment of an apparatus in accordance with the present inventions.
Figure 5C:
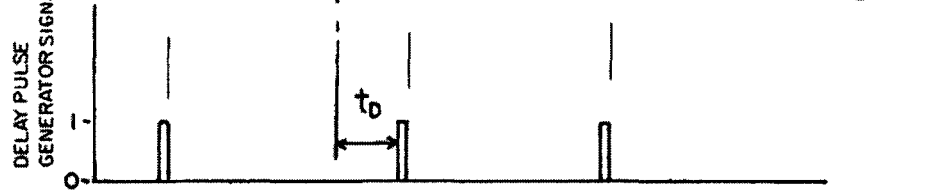
FIG. 5C illustrates a timing diagram of the delay pulse generator signal in an exemplary embodiment of an apparatus in accordance with the present inventions.
Figure 5E:
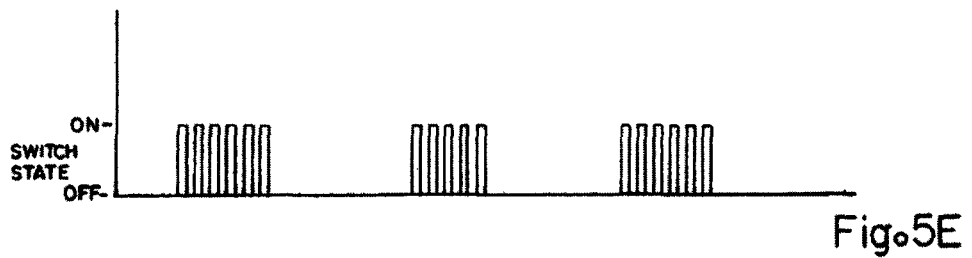
FIG. 5E illustrates a timing diagram of the switch state in an exemplary embodiment of an apparatus in accordance with the present inventions.
Figure 5D:
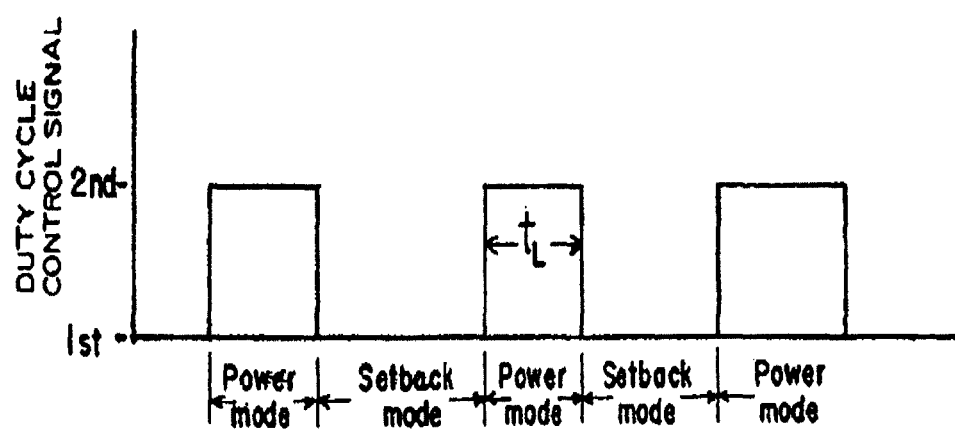
FIG. 5D illustrates a timing diagram of the duty cycle control signal in an exemplary embodiment of an apparatus in accordance with the present inventions.

The sequence of signals in the embodiment of the duty cycle control 170 illustrated in FIG. 4B including the signals from the zero cross detector 174, the delay pulse generator 178, and the logical signal generator 182, is illustrated in FIGS. 5A to 5E and in FIGS. 6A to 6D. The state of the switch 60 is illustrated in FIG. 5E and in FIG. 6A. As illustrated in FIG. 5A, the voltage source 100 in this embodiment is a fully rectified AC voltage source that has the form of a rectified sine wave with twice the frequency of the AC voltage source. The zero cross detector 174 generates the zero cross detector signal generally at the zero points of the discontinuous DC voltage, as illustrated in FIG. 5B. The delay pulse generator 178 then generates the delayed pulse generator signal, which is delayed by delay time $t_D$ from the zero cross detector signal, as illustrated in FIG. 5C. The delay time $t_D$ may be chosen so that the signal generated by the delay pulse generator 178 occurs generally near the leading portions of the peaks of the discontinuous DC voltage. The duty cycle control signal generated by the logical signal generator 182 may have a duration $t_L$, where $t_L$ may be chosen so that the logical signal generally coincides with the peak of the waveform, as illustrated in FIG. 5D. As illustrated in FIG. 5E, the switch control 70 may toggle the switch 60 to generated the regulated current only during the duration $t_L$ of the second duty cycle control signal, which corresponds to the power mode. The switch 60 is maintained in the OFF state during the first duty cycle control signal, which corresponds to the setback mode.

Figure 6A:
FIG. 6A illustrates a timing diagram of the switch state in an exemplary embodiment of an apparatus in accordance with the present inventions.
Figure 6B:
FIG. 6B illustrates a timing diagram of the timing signal in an exemplary embodiment of an apparatus in accordance with the present inventions.
Figure 6C:
FIG. 6C illustrates a timing diagram of the current in the regulating unit of an exemplary embodiment of an apparatus in accordance with the present inventions.
Figure 6D:
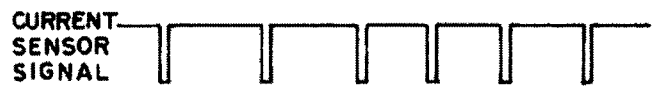
FIG. 6D illustrates a timing diagram of the current sensor signal in an exemplary embodiment of an apparatus in accordance with the present inventions.

FIGS. 6A to 6D illustrate the sequence of signals during the power mode in the embodiment of FIGS. 4A to 4C. As illustrated in FIGS. 6A and 6B, as the timing signal is alternated between 0 and 1, the switch 60 is alternated between the OFF state and the ON state in correspondence. When the switch 60 is in the ON state, the regulating unit 20 is connected to ground 150 so that current flows onto the LED 30 from the voltage source 100, and current is stored in the inductor 50. When the switch 60 is in the OFF state, the inductor 50 is discharged onto the LED 30 through free-wheel diode 40, and the current drops in regulating unit 20. An example of the current ripple about the maximum regulated current $I_{max}$ is illustrated in FIG. 6C. The current sensor signal which is triggered when the current reaches $I_{max}$ is also illustrated in FIG. 6D.

Figure 7:
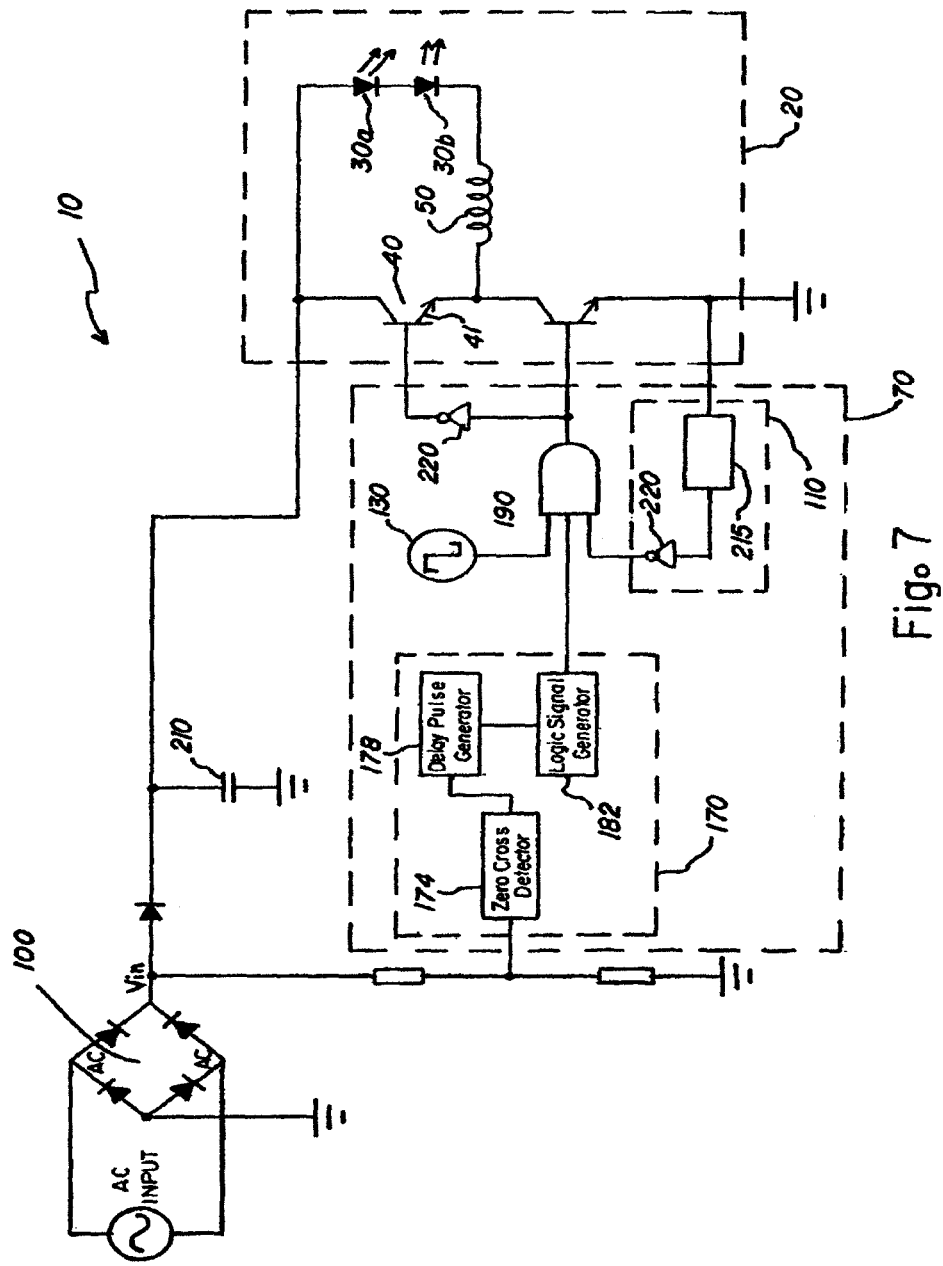
FIG. 7 illustrates a schematic diagram of an exemplary embodiment of an apparatus in accordance with the present inventions.

A schematic of an exemplary embodiment of an apparatus 10 according to the present invention is illustrated in FIG. 7. In this figure, the voltage source 100 is an AC voltage rectified by a full bridge rectifier and applied to LED's 30a, 30b. A capacitor 210 may be included to filter high frequency voltage noise. In this embodiment, the current sensor unit 110 includes a current sensor 215 in series with an inverter 220. The current sensor 215 generates a current sensor signal configured as a logic signal with a high value (1) corresponding to the current equaling or exceeding the upper current limit $I_{max}$. If the current drops below $I_{max}$, the current sensor unit 110 generates the low signal (0). The current sensor 215 could be, for example, a current sense resistor connected to a voltage comparator IC. In this embodiment, the signal from the current sensor is inverted by an inverter 220 in order to generate the current sensor signal, with a low value (0) indicative of current equaling or exceeding the upper current limit $I_{max}$ and the high value (0) indicative of the current below $I_{max}$. The current sensor signal in then input to the logical gate 190, as illustrated.

In the embodiment of FIG. 7, the free-wheel diode 40 in the regulating unit 20 is configured as a transistor 41 having a gate in communication with the switch control 70 through an inverter 220. The inverter 220 inverts the switch control signal, so that the connection between the gate and the drain of the transistor 41 is open when the switch 60 is in the ON state and the gate and the drain of the transistor 41 are in electrical communication when the switch 60 is in the OFF state.

The present inventions may also include methods for providing a regulated pulsed current from a voltage source 100. The methods may include providing a voltage source 100 and providing a regulating unit 20 having a switch 60 with an ON state and an OFF state, an LED 30, an inductor 50, and a free-wheel diode 40. The method may include determining a setback mode and a power mode. The method may further include charging the inductor 50 with the discontinuous DC current and discharging the inductor 50 into the LED 30 by toggling the switch 60 between the ON state and the OFF state during the power mode. The methods may further include maintaining the switch 60 in the OFF state during the setback mode so that substantially no current flows onto the LED 30 from the voltage source 100 during the setback mode. By providing regulated current to the LED 30 during the power mode and by no current flowing onto the LED 30 from the voltage source 100 during the setback mode, the methods may provide a regulated pulsed current to the LED 30.

The methods may further include the setback mode and the power mode corresponding to portions of the waveform of the voltage source 100.

In various aspects, the methods may include providing a switch control 70 to control the state of the switch 60 by toggling the switch 60 between the ON state and the OFF state. In some aspects, the methods may further include configuring the switch control 70 from a clock 130, a current sensor unit 110, a duty cycle control 170, and a logical gate 190. In some aspects, the methods may further include configuring the duty cycle control 170 from a zero cross detector 174, a delay pulse generator 178, and a logical signal generator 182.

Although the present invention has been described with reference to preferred embodiments, those skilled in the art will recognize changes that may be made in form and detail without departing from the spirit and scope of the invention.

What is claimed is:

1. A method, comprising:
    providing a regulating unit, the regulating unit allowing current to flow onto an load from a voltage source;
    providing a switch control;
    determining a setback mode and a power mode;
    controlling the regulating unit by the switch control thereby allowing a regulated current to flow onto the load during the power mode;
    providing in the regulating unit an inductor and a switch electrically communicating in series with the LED;
    regulating the current flow onto the load by charging the inductor from the voltage source and discharging current from the inductor onto the load by toggling the switch between an ON state and an OFF state;
    providing a current sensor unit, a clock, and a duty cycle control in the switch control;
    generating a current sensor signal indicative of the current in the regulating unit by the current sensor unit; and
    generating a switch control signal in response to the current sensor signal the switch control signal placing the switch in the ON state and the OFF state.

2. The method, as in claim 1, further comprising:
    sequencing the power mode and the setback mode with the wave form of the voltage source.

3. The method, as in claim 1, further comprising:
    generating a timing signal by the clock; and
    generating a duty cycle control signal indicating the power mode and the setback mode by the duty cycle control;
    wherein the step of generating a switch control signal in response to the current sensor signal includes generating a switch control signal in response to the current sensor signal the timing signal, and the duty cycle control signal, the switch control signal placing the switch in the ON state and the OFF state.

4. The method, as in claim 1, further comprising:
    providing a logical gate;
    inputting the current sensor signal into the logical gate;
    inputting the timing signal into the logical gate;
    inputting the duty cycle control signal into the logical gate; and generating the switch control signal by the logical gate.

* * * * *